United States Patent
Jin

(10) Patent No.: US 7,341,135 B2
(45) Date of Patent: Mar. 11, 2008

(54) OVERRUNNING CLUTCH

(76) Inventor: Feng Jin, 11-3-102, Zhongxinqu, No. 3 Yard, Dagang Oilfield, Tianjin (CN) 300280

( * ) Notice: Subject to any disclaimer, the term of this patent is extended or adjusted under 35 U.S.C. 154(b) by 0 days.

(21) Appl. No.: 11/557,042

(22) Filed: Nov. 6, 2006

(65) Prior Publication Data

US 2007/0256906 A1 Nov. 8, 2007

Related U.S. Application Data

(63) Continuation of application No. 10/381,352, filed as application No. PCT/CN01/01038 on Jun. 25, 2001.

(30) Foreign Application Priority Data

| Jun. 18, 2001 | (CN) | ................... 01 1 29231 |
| Sep. 29, 2001 | (CN) | ................... 00 2 54031 |

(51) Int. Cl.
*F16D 41/12* (2006.01)
(52) U.S. Cl. ......................... 192/46; 192/84.3
(58) Field of Classification Search ................... 192/46, 192/84.3, 84.8, 64, 71, 76; 74/576; 188/82.7, 188/82.77
See application file for complete search history.

(56) References Cited

U.S. PATENT DOCUMENTS

| 1,412,336 A | 4/1922 | Carter |
| 2,340,368 A | 2/1944 | Dodge |
| 2,409,009 A | 10/1946 | Bakke |
| 2,583,843 A | 1/1952 | Herrick |
| 2,971,621 A | 2/1961 | Sinclair et al. |
| 3,008,560 A | 11/1961 | Short |
| 3,093,226 A | 6/1963 | Basebe et al. |
| 3,197,001 A | 7/1965 | Clements |
| 5,197,258 A | 3/1993 | Johanek |
| 5,205,386 A | 4/1993 | Goodman et al. |
| 5,361,182 A | 11/1994 | Sampietro et al. |
| 5,970,825 A | 10/1999 | Barnett et al. |
| 6,680,553 B1 | 1/2004 | Takano |
| 2003/0057047 A1* | 3/2003 | Jin ............................... 192/46 |

FOREIGN PATENT DOCUMENTS

| CN | 2092628 | 1/1992 |
| CN | 01129231.8 | 6/2001 |
| CN | 00254031.2 | 9/2001 |
| GB | 908128 | 10/1962 |
| JP | 55119231 | 9/1980 |
| RU | 1543146 | 2/1990 |

* cited by examiner

*Primary Examiner*—Rodney H. Bonck
(74) *Attorney, Agent, or Firm*—Sheldon Mak Rose & Anderson

(57) ABSTRACT

An overrunning clutch comprising a ratchet wheel (1) and a plurality of pawls (2) is disclosed. Each of the pawls (2) is rotationally supported on a disk member (5) by a shaft (3). The clutch is characterized by a permanent magnet (4) being fixed on the disk member (5) between the axes of the disk member (5) and the shaft (3) and facing the tail end of each pawl (2). Because each of the pawls are not driven by a spring in the clutch, the clutch could not be malfunction due to the fatigue failure of the spring in the case of frequent heavy load.

30 Claims, 1 Drawing Sheet

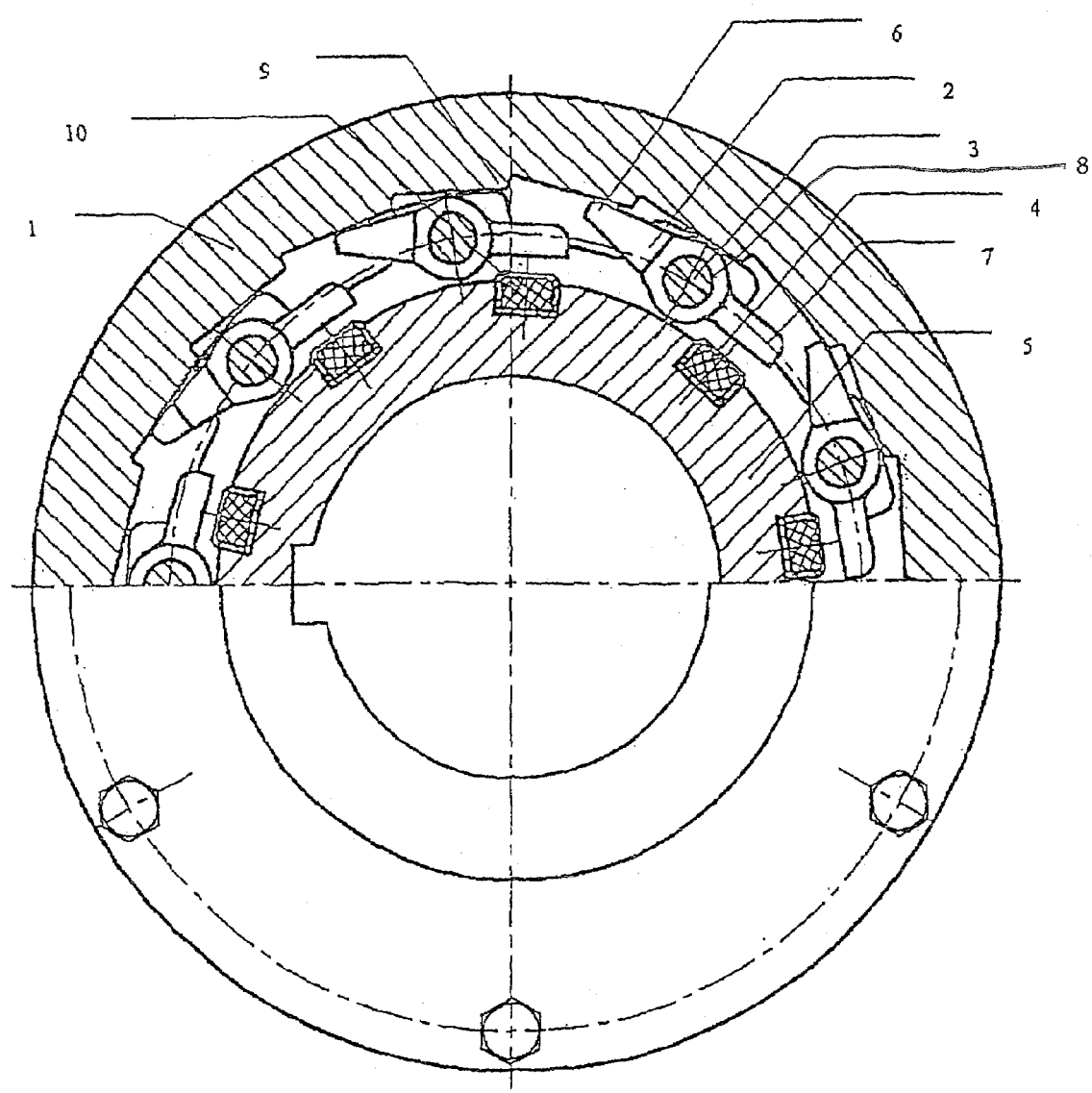

OVERRUNNING CLUTCH

CROSS REFERENCE TO RELATED APPLICATIONS

This application is a continuation of application Ser. No. 10/381,352 filed on Sep. 22, 2003 and now abandoned, which claims priority from PCT International Application No. PCT/CN01/01038 filed Jun. 25, 2001, which claims priority from China Application No. 00254031.2 filed Sep. 29, 2001 and China Application No. 01129231.8 filed Jun. 18, 2001, the complete disclosures of which are hereby incorporated by reference.

TECHNICAL FIELD

The present invention relates to an overrunning clutch, and more particularly, to a clutch that is in frequently overrunning condition with heavy load.

BACKGROUND ART

An inertial centrifugal ratchet is disclosed in Chinese Utility Model patent CN91208227.5, wherein a magnetic ring is provided under the ratchet. The pawls stretch radially outwardly in the direction effected by the centrifugal force when gears are turning so as to mesh with the teeth of the ratchet. According to the technical solution disclosed in the patent, the ratchet can't operate reliably when the pawls do not rotate flexibly, which is due to the centrifugal force that makes the pawls stretch radially outwardly to mesh with the teeth of the ratchet.

A US patent (U.S. Pat. No. 5,205,386) disclosed a pawl and ratchet clutch with a pawl holdback means, wherein a magnet is disposed radially outwardly of associated pawl meshing end. The pawls stretch radially outwardly by the centrifugal force when the driving shaft rotates at a speed above a desired value. Once the pawl contacts with associated magnet, it will be held by said magnet. Such clutch still utilizes the spring force to drive pawl to swing and mesh with the teeth of said ratchet. Therefore, the spring will be loaded frequently and repeatedly in case of frequently overrunning condition with heavy load. The spring will be fatigue failure quickly and make the clutch be malfunction. In addition, mechanical contact will take place between the magnet and the end of pawl of the clutch during operation, which makes the two parts impinge each other frequently. Such contact and impingement cause damage on magnet or make the magnet become hot. The clutch could be malfunction when the magnet is damaged. The magnet will shrink when it is heated and then is relaxed, which will also make the clutch be malfunction.

DISCLOSURE OF INVENTION

The object of the present invention is to provide an overrunning clutch which doesn't need a spring to drive the pawl.

The present invention can achieve said object by providing a type of overrunning clutch comprising a ratchet wheel and a plurality of pawls. Each of the pawls is rotationally supported on a disk member by a shaft. A permanent magnet is fixed on the disk member between the axes of said disk member and said shaft and opposing to the tail end of each pawl.

According to one preferred embodiment, such pawl includes a ratchet end which engages with the ratchet teeth and a tail end away from the ratchet end. A through hole for said shaft is provided between the ratchet end and the tail end. The distance from the tip of the ratchet end to the axis of the through hole is larger than that from the tip of the tail end to the axis of the through hole.

According to the present invention, the magnet is provided near the tail end of said pawl and between the axes of the disk member and the shaft.

The distance from the tip of the ratchet end of the pawl to the axis of the through hole is slightly larger than that from the tip of the tail end to the axis of the through hole. The ratio of the distance from the tip of the tail end to the axis of the through hole to the distance from the tip of the ratchet end to the axis of the through hole is preferred to be 1:1.1.

According to another preferred embodiment of the present invention, the clutch further includes a mounting sleeve embedded in said disk member. The permanent magnet is provided inside the said mounting sleeve. The mounting sleeve is preferably made of non-magnetic conduct materials, such as stainless steel, copper, aluminum, or the like.

The permanent magnet is made of ferrite, preferably the material of Neodymium-Fe-Boron. It is a cylinder, and the diameter of the cylinder is 16 mm and its height is 10 mm.

According to one preferred embodiment of the present invention, the distance between the tail end of said pawl and the permanent magnet is 1 mm when the ratchet end of said pawl engages with the ratchet teeth, the maximum distance between the tail end of said pawl and the permanent magnet is 5 mm when the pawl disengages with the ratchet teeth.

This invention utilizes the magnetic force to make the pawl and the ratchet engage with each other. Since no springs are applied, there are no problems of fatigue failure. This will significantly extend the service life of the clutch according to this invention in the case of frequently heavy load.

According to the present invention, the magnet will not contact with the tail end of the pawl during operation. Such formation can ensure that the magnet will not be impinged by the tail end of the pawl during operation, which means that there is no force acting on it directly. Therefore, the magnet will not be worn or be damaged by mechanical force and it will not produce the problems of fatigue failure existing in the prior art because there is no mechanical force acting on the magnet directly. So the service life of the clutch according to this invention can be extended. On the other hand, since the magnet has the nature of shrinking when it is heated and expanding when it is cooled, the clearance between the magnet and the fixed means will be enlarged when the magnet is impinged by the mechanical force and produces heat during operation. In such case the magnet will become loose. According to this invention, there is no direct contact between the magnet and the tail end of the pawl, so the magnet will not become loose when being heated. Such formation can ensure the magnet to operate for a long time and can extend the service life of the clutch of this invention.

According to this invention, the distance from the tip of the ratchet end of the pawl to the axis of the through hole is larger than that from the tip of the tail end to the axis of the through hole. Such structure can ensure the pawl to move reliably and be influenced by a small magnetic force, therefore it can ensure the reliability of the clutch of this invention.

BRIEF DESCRIPTION OF THE DRAWINGS

The present invention will be further described through the specific embodiments in connection with the accompanying drawings, in which:

The single FIGURE is a schematic view of the construction according to this invention.

DETAILED DESCRIPTION OF THE EMBODIMENTS OF THE INVENTION

The number 1 indicates a ratchet wheel in the FIGURE, the ratchet teeth 9 are provided on the inner side of the ratchet wheel 1. The disk member 5 is coaxial with ratchet wheel 1 and can rotate relatively to the ratchet wheel 1. A number of pawls 2 are shown in the FIGURE, the practical number of the pawls can be determined according to the working condition. Each of the pawls 2 is rotationally supported on the disk member 5 by a shaft 3 through a through hole 8. The pawl 2 is a long and thin element made of ferromagnetism material such as steel. The pawl 2 includes a ratchet end 6 which engages with the teeth of said ratchet wheel, and a tail end 7 is opposing to the ratchet end 6. The distance a from the tip of the ratchet end 6 to the center of the shaft 3 is larger than the distance b from the tip of the tail end 7 to the center of the shaft 3. In this embodiment, a equals to 40 mm, b equals to 36 mm. The ratio of a/b can ensure the pawl 2 to engage with ratchet teeth 9 on the ratchet wheel 1 reliably under the action of the magnetic force of the magnet 4.

The magnet 4 is provided between the axes of the disk member 5 and the axes of the shaft 3. Magnet 4 is near the tail end 7 of pawl 2. In this embodiment, the distance between the tail end 7 of said pawl 2 and the magnet 4 is 1 mm when pawl 2 engages with the ratchet teeth 9, the maximum distance between the tail end 7 of said pawl 2 and the magnet 4 is 5 mm when pawl 2 disengages with the ratchet teeth 9. These clearances are ensured by the dimensions of respective elements and their relative position.

In this embodiment, the shape of magnet 4 is a cylinder and its diameter is 16 mm and its height is 10 mm. Magnet 4 is made of ferrite, preferably Neodymium-Fe-Boron. The pawl 2 is made of ferromagnetism material, such as steel. Certainly, the shape of the magnet 4 can be other form, such as a rod with a rectangular cross-section and so on.

A mounting sleeve 10 is provided between magnet 4 and disk member 5. The mounting sleeve 10 preferably is made of non-magnetic material, such as stainless steel, copper, aluminum, or the like. The used material can block effectively the path of the magnetic line of force to utilize the magnetic force of magnet 4 to the full extent and to drive the pawl 2. In this embodiment, mounting sleeve 10 is just like a cup. The magnet 4 is placed into the mounting sleeve 10 from the upper open end thereof, then the mounting sleeve 10 and the magnet 4 are together brought into a respective hole in the disk member 5. The mounting sleeve 10 and the magnet 4 can be fixed in the disk member 5 through the method of press-fit. Other ways can be utilized for said connection, for example, the mounting sleeve 10 and the disk member 5 can be connected together by threading or welding or the like.

The invention claimed is:

1. A ratchet overrunning clutch comprising a ratchet wheel (1) and a plurality of pawls (2), each of the pawls (2) is rotationally supported on a disk member (5) by a shaft (3), wherein a permanent magnet (4) being fixed on the disk member (5) between the axes of the disk member (5) and the shaft (3) of the pawl (2) and opposing to a tail end of pawl (2).

2. The clutch according to claim 1, wherein the pawl (2) includes a ratchet end (6) which engages with the teeth of said ratchet wheel and a tail end (7) away from the ratchet end (6), a through hole (8) for said shaft (3) is provided between the ratchet end (6) and the tail end (7).

3. The clutch according to claim 1, wherein the distance from the tip of the ratchet end (6) to the axis of the through hole (8) is larger than that from the tip of the tail end (7) to the axis of the through hole (8).

4. The clutch according to claim 1, wherein the permanent magnet (4) is made of Neodymium-Fe-Boron.

5. The clutch according to claim 4, wherein the shape of the permanent magnet (4) is a cylinder and its diameter is 16 mm and its height is 10 mm.

6. The clutch according to claim 1, wherein the shape of the permanent magnet (4) is a cylinder and its diameter is 16 mm and its height is 10 mm.

7. The clutch according to claim 1, wherein the distance between the tail end (7) of said pawl (2) and the permanent magnet (4) is 1 mm when a ratchet end (6) of said pawl (2) engages with the teeth (9); the maximum distance between the tail end (7) of said pawl (2) and the permanent magnet (4) is 5 mm when the pawl (2) disengages with the teeth (9).

8. A ratchet overrunning clutch comprising a ratchet wheel (1) and a plurality of pawls (2), each of the pawls (2) is rotationally supported on a disk member (5) by a shaft (3), wherein a permanent magnet (4) being fixed on the disk member (5) between the axes of the disk member (5) and the shaft (3) of the pawl (2) and opposing to a tail end of pawl, wherein the pawl (2) includes a ratchet end (6) which engages with the teeth of said ratchet wheel and said tail end (7) away from the ratchet end (6), a through hole (8) for said shaft (3) is provided between the ratchet end (6) and the tail end (7), and wherein the distance from the tip of the ratchet end (6) to the axis of the through hole (8) is larger than that from the tip of the tail end (7) to the axis of the through hole (8), and wherein the ratio of the distance from the tip of the tail end (7) to the center of the through hole (8) to the distance from the tip of the ratchet end (6) to the center of the through hole (8) is 1:1.1.

9. A ratchet overrunning clutch comprising a ratchet wheel (1) and a plurality of pawls (2), each of the pawls (2) is rotationally supported on a disk member (5) by a shaft (3), wherein a permanent magnet (4) being fixed on the disk member (5) between the axes of the disk member (5) and the shaft (3) of the pawl (2) and opposing to a tail end of pawl (2), wherein the clutch further includes a mounting sleeve (10) embedded in said disk member (5), and wherein the permanent magnet (4) is provided in said mounting sleeve (10).

10. The clutch according to claim 9, wherein the mounting sleeve (10) is made of non-magnetic material.

11. The clutch according to claim 10, wherein the mounting sleeve (10) is made of stainless steel.

12. The clutch according to claim 9, wherein the mounting sleeve (10) is made of stainless steel.

13. A ratchet overrunning clutch comprising a ratchet wheel; a disk member having an axis; a plurality of pawls, each of the pawls having a ratchet end for engaging the ratchet wheel and an oppositely extending tail end, each pawl being rotationally supported on the disk member by a shaft; and for each pawl a corresponding permanent magnet being fixed relative to the disk member at a distance from the axis of the disk member being less than a distance from the axis of the disk member to an axis of the shaft of the pawl, the magnet opposing the tail end of the pawl.

14. The clutch according to claim 13, wherein the pawl is formed having a through hole between the ratchet end and the tail end, the shaft being received in the through hole.

15. The clutch according to claim 14, wherein the ratchet end extends a distance from the axis of the shaft being greater than a distance the tail end extends from the axis of the shaft.

16. The clutch according to claim 13, wherein the permanent magnet is cylindrical, having a diameter of approximately 16 mm and a length of approximately 10 mm.

17. The clutch according to claim 13, wherein the permanent magnet comprises Neodymium-Fe-Boron.

18. The clutch according to claim 17, wherein the permanent magnet is cylindrical, having a diameter of approximately 16 mm and a length of approximately 10 mm.

19. The clutch according to claim 13, wherein the tail end of the pawl is spaced away from the permanent magnet when the ratchet end of the pawl is engaged with the ratchet wheel.

20. The clutch according to claim 19, wherein the permanent magnet is at least approximately 1 mm from the tail end of the pawl when the pawl is engaged with the ratchet wheel, and not more than approximately 5 mm when the pawl is disengaged from the ratchet wheel.

21. A ratchet overrunning clutch comprising a ratchet wheel (1) and a plurality of pawls (2), each of the pawls (2) is rotationally supported on a disk member (5) by a shaft (3), wherein a permanent magnet (4) being fixed on the disk member (5) between the axes of the disk member (5) and the shaft (3) of the pawl (2) and opposing to a tail end of pawl,
wherein the pawl (2) includes a ratchet end (6) which engages with the teeth of said ratchet wheel and said tail end (7) away from the ratchet end (6), a through hole (8) for said shaft (3) is provided between the ratchet end (6) and the tail end (7), and
wherein the distance from the tip of the ratchet end (6) to the axis of the through hole (8) is larger than that from the tip of the tail end (7) to the axis of the through hole (8), and
wherein the ratio of the distance from the tip of the tail end (7) to the center of the through hole (8) to the distance from the tip of the ratchet end (6) to the center of the through hole (8) is 1:1.1.

22. A ratchet overrunning clutch comprising a ratchet wheel; a disk member having an axis; a plurality of pawls, each of the pawls having a ratchet end for engaging the ratchet wheel and an oppositely extending tail end, each pawl being rotationally supported on the disk member by a shaft; and for each pawl a corresponding permanent magnet being fixed relative to the disk member at a distance from the axis of the disk member being less than a distance from the axis of the disk member to an axis of the shaft of the pawl, the magnet opposing the tail end of the pawl, wherein the clutch further comprises a mounting sleeve embedded in the disk member, the permanent magnet being provided in the mounting sleeve.

23. The clutch according to claim 22 wherein the mounting sleeve is made of stainless steel.

24. The clutch according to claim 22, wherein the mounting sleeve is made of a non-magnetic material.

25. The clutch according to claim 24, wherein the mounting sleeve comprises stainless steel.

26. A ratchet overrunning clutch comprising:
a) a ratchet wheel;
b) a disk member;
c) a plurality of pawls, each pawl being rotationally supported by the disk member and having a ratchet end for engagement with the ratchet wheel and a tail end extending oppositely from the ratchet end; and
d) a magnet fixed relative to the disk member and opposing the tail end of the pawl for urging the ratchet end of the pawl into engagement with the ratchet wheel.

27. The clutch according to claim 26 wherein, when the pawl is engaging the ratchet wheel, the magnet is spaced from the pawl for preventing contact therebetween.

28. The clutch according to claim 27, wherein the spacing between the pawl and the magnet is at least approximately 1 mm.

29. A ratchet overrunning clutch comprising:
a) a ratchet wheel;
b) a disk member;
c) a plurality of pawls, each pawl being rotationally supported by the disk member and having a ratchet end for engagement with the ratchet wheel and a tail end extending oppositely from the ratchet end; and
d) a permanent magnet fixed relative to the disk member and opposing the tail end of the pawl for urging the ratchet end of the pawl into engagement with the ratchet wheel, wherein the clutch further includes a mounting sleeve embedded in the disk member, the permanent magnet being supported in the mounting sleeve.

30. The clutch according to claim 29, wherein the mounting sleeve is made of a non-magnetic material for blocking magnetic lines of force into the disk member, thereby enhancing utilization of the magnetic force to drive the pawl.

* * * * *